US010618628B2

(12) United States Patent
Brown

(10) Patent No.: US 10,618,628 B2
(45) Date of Patent: Apr. 14, 2020

(54) AIRCRAFT WING SYSTEM

(71) Applicant: BAE Systems plc, London (GB)

(72) Inventor: Robert Brown, Preston (GB)

(73) Assignee: BAE Systems plc, London (GB)

(*) Notice: Subject to any disclaimer, the term of this patent is extended or adjusted under 35 U.S.C. 154(b) by 351 days.

(21) Appl. No.: 15/577,905

(22) PCT Filed: Jun. 17, 2016

(86) PCT No.: PCT/GB2016/051815
§ 371 (c)(1),
(2) Date: Nov. 29, 2017

(87) PCT Pub. No.: WO2016/203255
PCT Pub. Date: Dec. 22, 2016

(65) Prior Publication Data
US 2018/0162517 A1 Jun. 14, 2018

(30) Foreign Application Priority Data

Jun. 18, 2015 (EP) .................................. 15275157
Jun. 18, 2015 (GB) .................................. 1510688.3

(51) Int. Cl.
B64C 9/24 (2006.01)
B64C 9/14 (2006.01)
(Continued)

(52) U.S. Cl.
CPC ................. B64C 9/24 (2013.01); B64C 9/14 (2013.01); B64C 9/18 (2013.01); F16H 49/001 (2013.01); Y02T 50/32 (2013.01)

(58) Field of Classification Search
CPC .... B64C 9/24; B64C 9/14; B64C 9/18; F16H 49/001; Y02T 50/32
See application file for complete search history.

(56) References Cited

U.S. PATENT DOCUMENTS 4,399,970 A    8/1983  Evans
4,650,140 A    3/1987  Cole
(Continued)

FOREIGN PATENT DOCUMENTS

DE    102007020870 A1    11/2008
DE    102011105912 A1    1/2013
(Continued)

OTHER PUBLICATIONS

International Preliminary Report on Patentability of International Application No. PCT/GB2016/051815, dated Dec. 19, 2017, 8 pages.
(Continued)

Primary Examiner — Rodney A Bonnette
(74) Attorney, Agent, or Firm — Maine Cernota & Rardin

(57) ABSTRACT

An aircraft wing system and method comprising: an aircraft wing; an edge device coupled to a leading edge or trailing edge of the aircraft wing; a drive shaft rotatable about its axis; a crank arm, a first end of the crank arm being coupled to the drive shaft, and a second end of the crank arm opposite to the first end being coupled to the edge device; and a gear system (e.g. a strain wave gear system) coupled between the drive shaft and the first end of the crank arm.

13 Claims, 5 Drawing Sheets

(51) Int. Cl.
*B64C 9/18* (2006.01)
*F16H 49/00* (2006.01)

(56) References Cited

U.S. PATENT DOCUMENTS

| | | | |
|---|---|---|---|
| 5,839,699 A | 11/1998 | Bliesner | |
| 6,464,176 B2* | 10/2002 | Uchida | B64C 3/50 244/216 |
| 8,864,083 B1 | 10/2014 | Shmilovich | |
| 2002/0005461 A1 | 1/2002 | Nettle | |
| 2009/0134281 A1* | 5/2009 | Engelbrecht | B64C 9/16 244/215 |
| 2010/0038478 A1* | 2/2010 | Knight | B64C 25/505 244/102 R |
| 2010/0219299 A1 | 9/2010 | Holzhausen | |
| 2011/0240803 A1 | 10/2011 | Shmilovich et al. | |
| 2011/0248122 A1 | 10/2011 | Schlipf et al. | |
| 2012/0091282 A1 | 4/2012 | Spiller | |
| 2012/0097791 A1 | 4/2012 | Turner et al. | |
| 2013/0181089 A1* | 7/2013 | Recksiek | B64C 9/16 244/99.3 |
| 2013/0277498 A1 | 10/2013 | Winkelmann | |
| 2014/0197272 A1 | 7/2014 | Otto | |
| 2015/0060607 A1 | 3/2015 | Havar | |
| 2015/0075310 A1 | 3/2015 | Lunin | |
| 2018/0162516 A1* | 6/2018 | Brown | B64C 9/24 |

FOREIGN PATENT DOCUMENTS

| | | |
|---|---|---|
| EP | 2578489 A2 | 4/2013 |
| GB | 2048181 A | 12/1980 |
| GB | 2138756 A | 10/1984 |
| WO | 2008110521 A1 | 9/2008 |
| WO | 2009056873 A1 | 5/2009 |
| WO | 2010119280 A1 | 10/2010 |
| WO | 2012031759 A2 | 3/2012 |
| WO | 2013007987 A2 | 1/2013 |

OTHER PUBLICATIONS

International Preliminary Report on Patentability of International Applciation No. PCT/GB2016/051816, dated Dec. 19, 2017, 8 pages.
International Search Report and Written Opinion of International Application No. PCT/GB2016/051816, dated Aug. 11, 2016, 12 pages.
Search Report under Section 17(5) of Great Britain application No. GB1510687.5, dated Nov. 25, 2015, 4 pages.
Extended European Search Report of European application No. 15275156.6, dated Nov. 25, 2015, 7 pages.
International Search Report and Written Opinion of International Application No. PCT/GB2016/051815, dated Oct. 20, 2016, 12 pages.
Search Report under Section 17(5) of Great Britain application No. GB1510688.3, dated Dec. 3, 2015, 4 pages.
Extended European Search Report of European application No. 15275157.4, dated Nov. 24, 2015, 7 pages.

* cited by examiner

AIRCRAFT WING SYSTEM

RELATED APPLICATIONS

This application is a National Phase application filed under 35 USC § 371 of PCT Application No. PCT/GB2016/051815 with an International filing date of Jun. 17, 2016, which claims priority of GB Patent Application GB1510688.3 filed Jun. 18, 2015 and EP Patent Application EP15275157.4 filed Jun. 18, 2015. Each of these applications is herein incorporated by reference in its entirety for all purposes.

FIELD OF THE INVENTION

The present invention relates to aircraft wing systems.

BACKGROUND

The wings of many different types of aircraft are equipped with high lift devices that are operable to increase the lift experienced by an aircraft wing. Such high lift devices may allow the wing to operate at a higher angle of attack.

An example of a high lift device is a slat. In use, a slat may be moved away from the leading edge of the fixed wing of an aircraft, thereby creating a gap between the slat and the wing under slat surface. Deploying slats in this way tends to allow an aircraft to fly at slower speeds, or take off and land in shorter distances.

A different, separate example of a high lift device is a leading edge flap, or a droop. Droops are leading edge sections that rotate downwards relative to a fixed aircraft wing. In contrast to a slat, the droop does not move away from the wing leading edge when it is deployed, and thus no gap between the droop and the wing under flap surface is created.

U.S. Pat. No. 4,399,970 discloses a wing leading edge slat actuation and positioning system. The system having a number of positions:—a stowed or retracted position; a first operative position where the upper surface of the slat and the upper surface of the fixed wing section form a substantially smooth and continuous upper surface; and a further extended position where a slot is formed between the leading edge of the fixed wing portion and the trailing edge of the extended slat panel.

SUMMARY OF THE INVENTION

In a first aspect, the present invention provides an aircraft wing system comprising: an aircraft wing; an edge device coupled to a leading edge or trailing edge of the aircraft wing; a drive shaft rotatable about its axis; a crank arm, a first end of the crank arm being coupled to the drive shaft, and a second end of the crank arm opposite to the first end being coupled to the edge device; a gear device coupled between the drive shaft and the first end of the crank arm; a further crank arm, a first end of the further crank arm being coupled to the drive shaft, and a second end of the further crank arm opposite to the first end being coupled to the edge device, the further crank arm being spaced apart from the crank arm along a length of the drive shaft; and a further gear system coupled between the drive shaft and the first end of the further crank arm; wherein a length of the crank arm may be different to that of the further crank arm.

The crank arm may be arranged to convert circular motion of the drive shaft to a reciprocating motion of the edge device.

The gear device may be configured such that a relatively higher speed rotation of the drive shaft causes a relatively lower speed rotation of the first end of the crank arm.

The gear device may be a strain wave gear device, for example, a Harmonic Drive gear device.

A gear ratio of the gear device may be equal to that of the further gear device.

The drive shaft may extend at least partially along a length of the aircraft wing. The crank arm may be shorter than the further crank arm. The crank arm may be located closer to a tip of the aircraft wing than the further crank arm.

The edge device may comprise a fairing coupled to the leading edge of the aircraft wing. The actuation means may be configured to move the fairing relative to the aircraft wing between a stowed position, a first deployed position, and a second deployed position. The stowed position may be when the fairing is in contact with the aircraft wing and the fairing serves as a continuation of the aircraft wing. The first deployed position may be when the fairing is in contact with the aircraft wing and located below the stowed position. The second deployed position may be when the fairing is spaced apart from the leading edge of the aircraft wing, thereby defining a gap between the fairing and the leading edge through which air may flow.

The actuation means may be configured to move the fairing relative to the aircraft wing between the stowed position and the first deployed position by rotating the fairing about a first axis. The actuation means may be configured to move the fairing relative to the aircraft wing between the first deployed position and the second deployed by rotating the fairing about a second axis. The second axis may be different to the first axis (e.g. the first and second axes may be spaced apart).

Rotating the fairing about the first axis may cause a portion of the fairing to slide over a surface of the aircraft wing while remaining in contact with the surface of the aircraft wing.

The aircraft wing system may further comprise a guiding system for guiding movement of the edge device relative to the aircraft wing. The guiding system may comprise: a bracket fixed to either the edge device or the aircraft wing, the bracket comprising two roller tracks; and two rollers fixed to the other of the one of the edge device and the aircraft wing than the one to which the bracket is fixed, the rollers being fitted in respective roller tracks of the bracket, each roller being configured to roll along the roller track to which it is fitted.

At least one roller track may comprise a first curved portion and a second curved portion joined together to form a continuous track. The first curved portion may have a different curvature to the second curved portion.

In a further aspect, the present invention provides an aircraft comprising an aircraft wing system according to any of the preceding aspects.

In a further aspect, the present invention provides an aircraft wing system comprising: an aircraft wing; an edge device coupled to a leading edge or trailing edge of the aircraft wing; a drive shaft rotatable about its axis; a crank arm, a first end of the crank arm being coupled to the drive shaft, and a second end of the crank arm opposite to the first end being coupled to the edge device; a gear device coupled between the drive shaft and the first end of the crank arm; and a guiding system for guiding movement of the edge device relative to the aircraft wing. The guiding system may comprise: a bracket fixed to either the edge device or the aircraft wing, the bracket comprising two roller tracks; and two rollers fixed to the other of the one of the edge device and the aircraft wing than the one to which the bracket is fixed, the rollers being fitted in respective roller tracks of the bracket, each roller being configured to roll along the roller track to which it is fitted.

In a further aspect, the present invention provides a method of operating an aircraft wing system. The aircraft wing system comprises: an aircraft wing; an edge device coupled to a leading edge or trailing edge of the aircraft wing; a drive shaft rotatable about its axis; a crank arm, a first end of the crank arm being coupled to the drive shaft, and a second end of the crank arm opposite to the first end being coupled to the edge device; and a gear system coupled between the drive shaft and the first end of the crank arm. The method comprises rotating the drive shaft so as to cause circular motion of the first end of the crank arm, thereby moving, relative to the aircraft wing, the edge device coupled to the second end of the crank arm.

In a further aspect, the present invention provides a method of producing an aircraft wing system, the method comprising: providing an aircraft wing; and coupling an edge device to a leading edge or trailing edge of the aircraft wing by: providing a drive shaft rotatable about its axis; coupling a first end of a crank arm to the drive shaft; coupling a second end of the crank arm opposite to the first end to the edge device; and coupling a gear device between the drive shaft and the first end of the crank arm.

DETAILED DESCRIPTION

Figure 1:
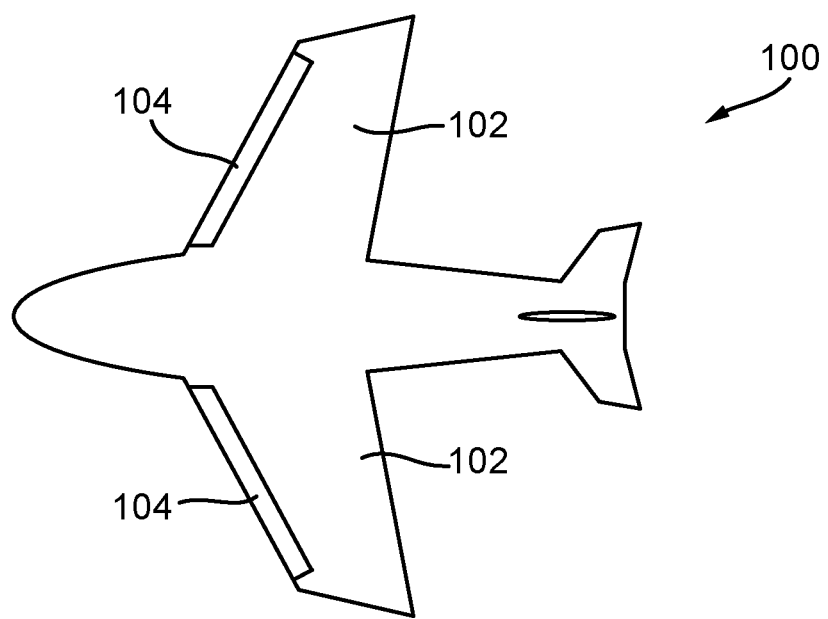
FIG. 1 is a schematic illustration (not to scale) of an aircraft.

FIG. 1 is a schematic illustration (not to scale) of an aircraft 100 comprising two wings 102. Each aircraft wing 102 comprises an embodiment of a leading edge system 104 located at the leading edge of that of that aircraft wing 102.

Figure 2:
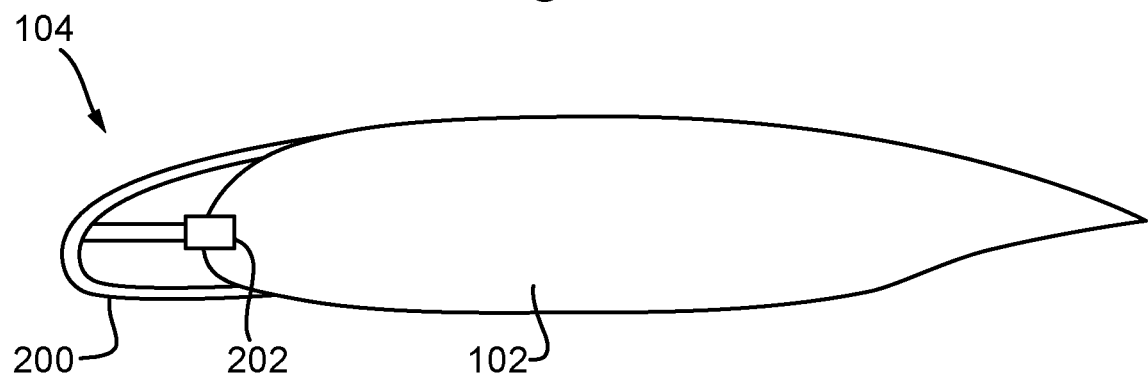
FIG. 2 is a schematic illustration (not to scale) showing a side view cross section through an aircraft wing and an associated leading edge system.

FIG. 2 is a schematic illustration (not to scale) showing a side view cross section through an aircraft wing 102 and the leading edge system 104 located thereon.

In this embodiment, the leading edge system 104 comprises a profiled fairing 200 and a coupling mechanism 202. The fairing 200 is attached to the leading edge of the aircraft wing 102 via the coupling mechanism 202.

In some embodiments, the fairing 200 includes a stiffening structure, for example one or more longitudinal stiffeners, which may be attached to a rear/trailing edge side of the fairing 200.

The coupling mechanism 202 is operable to move the fairing 200 with respect to the aircraft wing 102. Positions with respect to the aircraft wing 102 to which the fairing 200 may be moved are described in more detail later below with reference to FIGS. 3 to 5.

The coupling mechanism 202 and the operation thereof is described in more detail later below with reference to FIGS. 6 to 8.

Figure 3:
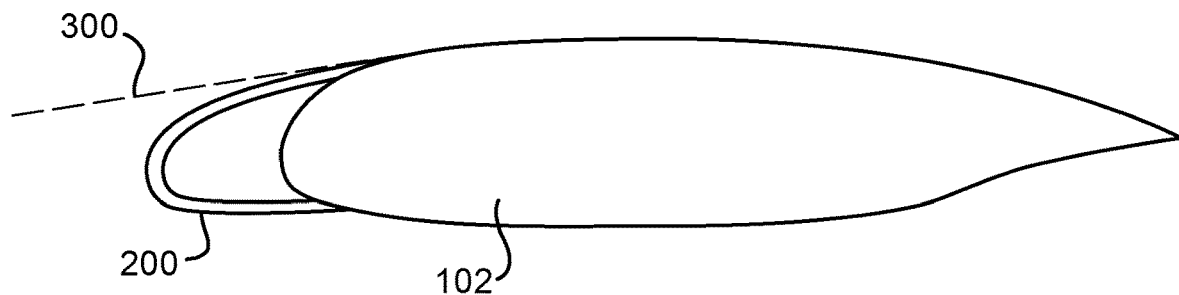
FIGS. 3 to 5 are schematic (not to scale) sectional views of the leading edge of the aircraft wing and respectively show a fairing of the leading edge system in retracted, dropped, and extended positions.

FIG. 3 is a schematic illustration (not to scale) showing the aircraft wing 102 and also showing the fairing 200 in a "retracted position" (or stowed).

In this embodiment, in the retracted position, the leading edge of the wing 102 is embraced by the profiled fairing 200. The shape of the fairing 200 matches the profile of the wing 102 such that, in the retracted position, the fairing 200 contacts the wing 102 at the upper and lower surfaces of the wing leading edge.

In this embodiment, in the retracted position, the upper surface of the fairing 200 is substantially contiguous with the upper surface of the aircraft wing 102. Thus, where the fairing 200 contacts the upper surface of the aircraft wing 102, the upper surface of the fairing 200 and the upper surface of the aircraft wing 102 lie in a common plane said common plane being indicated in FIG. 3 by a dotted line and the reference numeral 300.

In the retracted position, the lower surface of the fairing 200 may be substantially contiguous with the lower surface of the aircraft wing 102. In the retracted position, the lower surface of the fairing 200 may be in contact with the lower surface of the aircraft wing 102.

In an example use, the fairing 200 is positioned in the retracted position shown in FIG. 3 while that aircraft 100 is cruising at relatively high speed.

The coupling mechanism 202 may be operated to move the fairing 200 relative to the aircraft wing 102 from the retracted position to a "dropped position" and vice versa.

Figure 4:
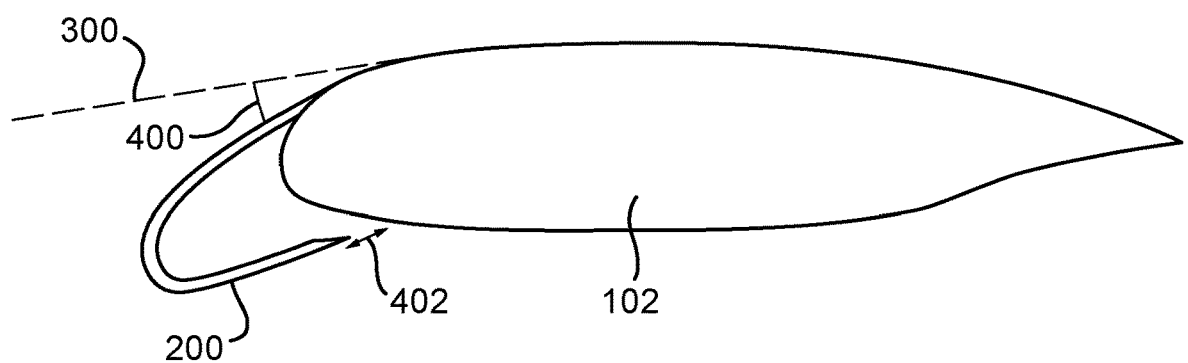

FIG. 4 is a schematic illustration (not to scale) showing the aircraft wing 102, and also showing the fairing 200 in the dropped position.

To move the fairing 200 from the retracted position to the dropped position, the fairing 200 is rotated downwards relative to the aircraft wing 102 about a first axis (not shown in the Figures). In this embodiment, this rotation is performed such that the upper portion of the fairing 200 slides over the upper portion of the leading edge of the wing 102. Throughout this rotation, the upper portion of the fairing 200 remains in contact with the upper surface of the aircraft wing 102.

Thus, in this embodiment, in the dropped position, the upper portion of the fairing 200 remains in contact with the upper surface of the aircraft wing 102 such that there is no gap between the fairing 200 and the wing 102 at the upper surface of the leading edge of the wing 102.

To move the fairing 200 into the dropped position, the fairing 200 is rotated downwards with respect to the aircraft wing 102 such that the upper surface of the fairing 200 is at a first angle 400 with the plane 300. In this embodiment, the first angle is 8°. Thus, moving the fairing 200 from the retracted position to the dropped position includes rotating the fairing 200 downwards (i.e. in a direction from the upper wing surface towards the lower wing surface) with respect to the wing 102, by 8°, i.e. from 0° to 8° from the plane 300. In other embodiments, the first angle has a different value, i.e. other than 8°.

In this embodiment, in the dropped position, the upper surface of the fairing 200 is substantially contiguous with the upper surface of the aircraft wing 102. In this embodiment, the upper surface of the fairing 200 remains substantially contiguous with the upper surface of the aircraft wing 102 throughout its rotation through the first angle.

In this embodiment, in the dropped position, the lower surface of the fairing 200 is not in contact with the lower surface of the aircraft wing 102, i.e. there is a gap (hereinafter referred to as the "first gap" 402) between the lower surface of the fairing 200 and the lower surface of the aircraft wing 102.

In the dropped position, the fairing 200 acts to increase the lift on the aircraft wing 102 compared to when the fairing 200 is in the retracted position. By moving the fairing 200 from its retracted position to its dropped position, in effect, the size of the suction surface of the aircraft wing 102 tends to be increased. Also, air flow over the aircraft wing 102 tends to remain attached to the upper surface of the wing 102 for an increased time. Thus, lift tends to be increased.

Furthermore, moving the fairing 200 from its retracted position to its dropped position tends to alter the camber of the aircraft wing 102 and reduce its stalling speed. Thus, stall characteristics of the aircraft wing 102 tend to be changed. This tends to allow for a correction of undesirable stall characteristics, for example, stall characteristics that cannot be corrected using a leading-edge slat because, when deployed, gaps between a leading-edge slat and the aircraft wing are created.

In its dropped position, the fairing 200, in effect, tends to function in a similar way to a droop.

In an example use, the fairing 200 is positioned in the dropped position shown in FIG. 4 while that aircraft 100 is operating at relatively high speed, and when increased lift, and/or an increase in the angle-of-attack at which the wing 102 will stall, is required.

The coupling mechanism 202 may be operated to move the fairing 200 relative to the aircraft wing 102 from the dropped position to an "extended position" and vice versa.

Figure 5:
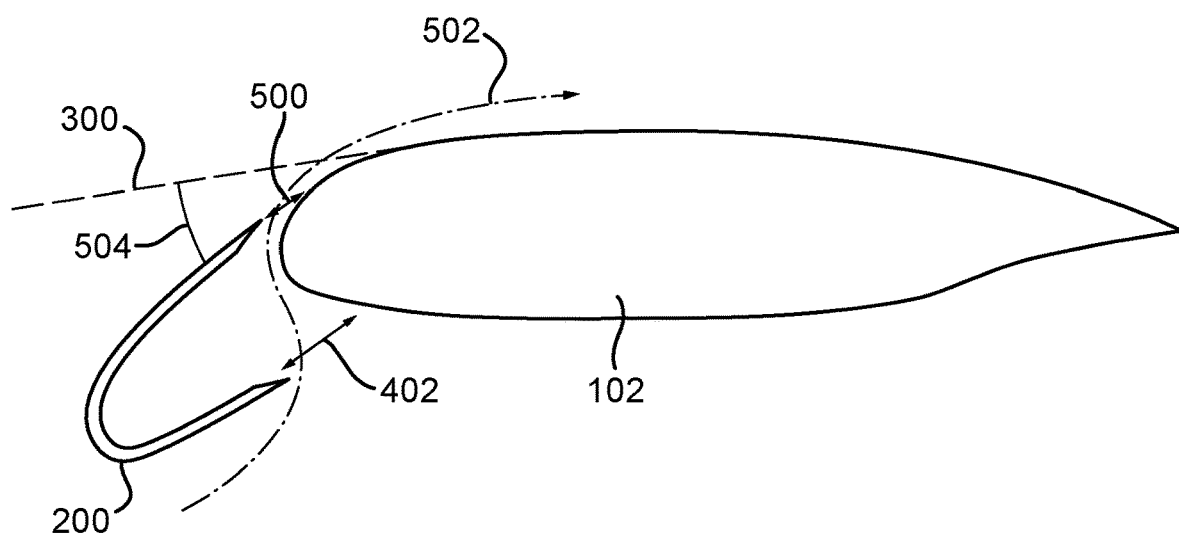

FIG. 5 is a schematic illustration (not to scale) showing the aircraft wing 102 and also showing the fairing in an extended position.

To move the fairing 200 from the dropped position to the extended position, the fairing 200 is rotated downwards relative to the aircraft wing 102 about a second axis (bot shown in the Figures). In this embodiment, the second axis is different to the first axis. This rotation is performed such that the fairing 200 is moved away from the leading edge of the wing 102, thereby creating a gap (hereinafter referred to as the "second gap" 500) between the upper portion of the fairing 200 and the upper surface of the leading edge of wing 102. Also, this rotation tends to increase the size of the first gap 402.

Thus, in this embodiment, in the extended position, the fairing 200 and the leading edge of the aircraft wing 102 are spaced apart such that air may flow between the fairing 200 and the aircraft wing 102, as indicated in FIG. 5 by a dotted arrow and the reference numeral 502.

To move the fairing 200 into the extended position, the fairing 200 is further rotated downwards with respect to the aircraft wing 102 such that the upper surface of the fairing 200 is at a second angle 504 with the plane 300. In this embodiment, the second angle is 17°. Thus, moving the fairing 200 from the dropped position to the extended position includes rotating the fairing 200 downwards (i.e. in a direction from the upper wing surface towards the lower wing surface) with respect to the wing 102, by 9°, i.e. from 8° to 17° from the plane 300. In some embodiments, the second angle has a different value, i.e. other than 17°.

In the extended position, that the gap 402, 500 between the fairing 200 and the wing 102, 500 tends to allow the wing 102 to work efficiently at higher angles of attack compared to, for example, when the fairing 200 is in the retracted position. Also, when the fairing 200 is in the extended position, the aircraft wing 102 and fairing 200 system tend to have relatively benign stall characteristics. Thus, by deploying the fairing 200 to its extended position, the aircraft 100 tends to be capable of flying at relatively slower speeds, or taking off and landing in shorter distances.

Moving the fairing 200 to its extended position tends to allow the wing 102 to operate at a higher angle of attack compared to when the fairing 200 was in its retracted or dropped position.

The fairing 200 may be deployed to its extended position when the aircraft 100 is landing or performing other manoeuvres which may take the aircraft 100 close to the stall. The fairing 200 may be retracted from its extended position to either its dropped position or retracted position when the aircraft 100 is operating at relatively higher speeds, for example, so as to reduce drag.

Figure 6:
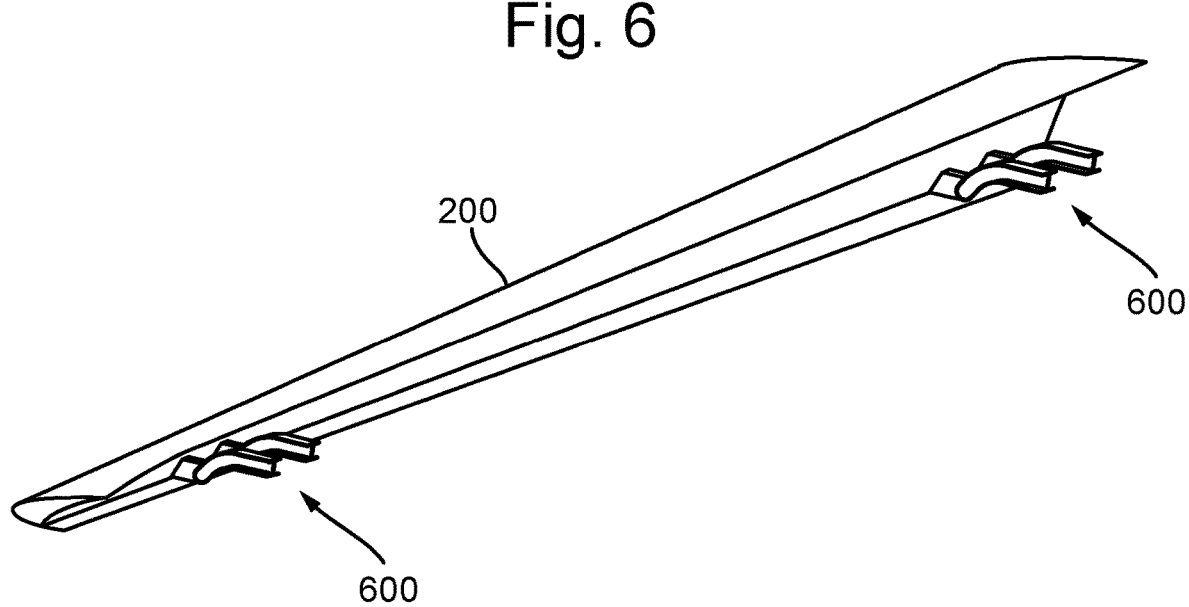
FIG. 6 is a schematic illustration (not to scale) of showing the fairing from its trailing edge side.

FIG. 6 is a schematic illustration (not to scale) of showing a the fairing 200 from its trailing edge side and showing a portion of the coupling mechanism 202 that is fixedly attached to the fairing 200. Further details of the portion of the coupling mechanism located in the aircraft wing 102 are provided later below with reference to FIG. 7.

In this embodiment, the portion of the coupling mechanism 202 that is fixedly attached to the fairing 200 comprises two brackets 600 attached to the fairing 200 at a certain distance from one another. The brackets 600 are made of metal, such as titanium or steel.

Figure 7:
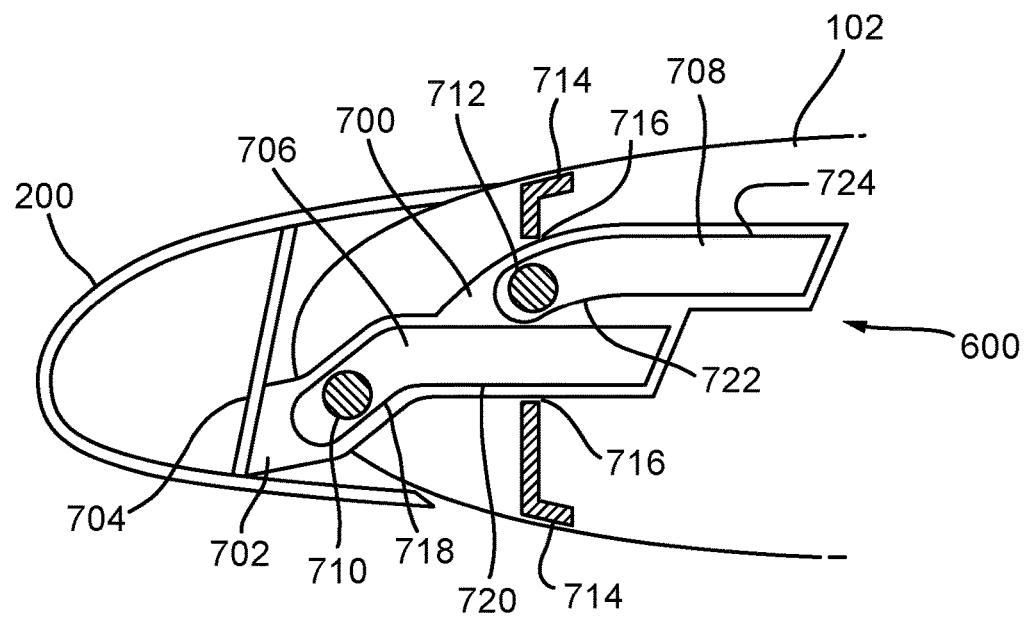
FIG. 7 is a schematic illustration (not to scale) is a cross section through the leading edge of the aircraft wing and fairing.

FIG. 7 is a schematic illustration (not to scale) is a cross section through the leading edge of the aircraft wing 102 and fairing 200 taken through a bracket 600.

The bracket 600 comprises an arcuate portion 700 terminating at the fairing end in a plate 702 attached to a supporting member 704 fixed to the fairing 200, and guided at its other end in the leading edge section of the wing 102.

Each bracket 600 comprises two roller tracks or slots, namely a first roller track 706 and a second roller track 708. In this embodiment, guidance is achieved by rollers, including a first roller 710 and a second roller 712 fitted into the first and second roller tracks 706, 708 respectively. The rollers 710, 712 have spindles in the horizontal plane. The rollers 710, 712 are carried by a structure 714 arranged in the wing 102, said structure 714 containing an opening 716 through which the bracket 600 moves in operation. For example, in some embodiments, the roller 710, 712 may be attached to respective ribs of the aircraft wing 102, said ribs being attached onto a front surface of a front spar of the aircraft wing 102.

In this embodiment, each first roller track 706 comprises two curved portions, namely a first curved portion 718 and a second curved portion 720. The first curved portion 718 extends from a proximal end of the first roller track 706 nearest the fairing 200, away from the fairing 200 to the second curved portion 720. The second curved portion 720 extends from the first curved portion 718 to a distal end of the first roller track 706 furthest from the fairing 200. The first and second curved portions 718, 720 are connected to one another so as to provide a continuous curved path along which the first roller 710 may roll.

In this embodiment, moving the fairing 200 from the retracted position to the dropped position comprises the first roller 710 rolling along the first curved portion 718 of the first roller track 706, from the proximal end of the first track 706 to where the first curved portion 718 joins the second curved portion 720. The first curved portion 718 has a first radius of curvature such that the first roller 710 rolling along the first curved portion 718 causes the fairing 200 to be rotated downwards about the above mentioned first axis. Moving the fairing 200 from the dropped position to the retracted position comprises the first roller 710 rolling along the first curved portion 718 in the reverse direction.

In this embodiment, moving the fairing 200 from the dropped position to the extended position comprises a the first roller 710 rolling along the second curved portion 720 of the first roller track 706, from where the second curved portion 720 joins the first curved portion 718 to the distal end of the first track 706 furthest from the fairing 200. The second curved portion 720 has a second radius of curvature such that the first roller 710 rolling along the second curved portion 720 causes the fairing 200 to be rotated downwards about the above mentioned second axis. In this embodiment, the second axis is different to the first axis. In this embodiment, the second radius of curvature is different to the first radius of curvature. Moving the fairing 200 from the extended position to the dropped position comprises the first roller 710 rolling along the second curved portion 720 in the reverse direction.

In this embodiment, each second roller track 708 comprises two curved portions, namely a third curved portion 722 and a fourth curved portion 724. The third curved portion 722 extends from a proximal end of the second roller track 708 nearest the fairing 200, away from the fairing 200 to the fourth curved portion 724. The fourth curved portion 724 extends from the third curved portion 722 to a distal end of the second roller track 708 furthest from the fairing 200. The third and fourth curved portions 722, 724 are connected to one another so as to provide a continuous curved path along which the second roller 712 may roll.

In this embodiment, moving the fairing 200 from the retracted position to the dropped position comprises the second roller 712 rolling along the third curved portion 722 of the second roller track 708, from the proximal end of the second track 708 to where the third curved portion 722 joins the fourth curved portion 724. The third curved portion 722 has a third radius of curvature such that the second roller 712 rolling along the third curved portion 722 causes the fairing 200 to be rotated downwards about the above mentioned first axis. Moving the fairing 200 from the dropped position to the retracted position comprises the second roller 712 rolling along the third curved portion 722 in the reverse direction.

In this embodiment, moving the fairing 200 from the dropped position to the extended position comprises a the second roller 712 rolling along the fourth curved portion 724 of the second roller track 708, from where the fourth curved portion 724 joins the third curved portion 722 to the distal end of the second track 708 furthest from the fairing 200. The fourth curved portion 724 has a fourth radius of curvature such that the second roller 712 rolling along the fourth curved portion 724 causes the fairing 200 to be rotated downwards about the above mentioned second axis. In this embodiment, the fourth radius of curvature is different to the third radius of curvature. Moving the fairing 200 from the extended position to the dropped position comprises the second roller 712 rolling along the fourth curved portion 724 in the reverse direction.

The brackets 600 each having two tracks 706, 708 advantageously tends to provide stability to the fairing 200 in use.

In this embodiment, the displacement of the fairing 200 with respect to the wing 102 is produced by a drive system, as will now be described.

Figure 8:
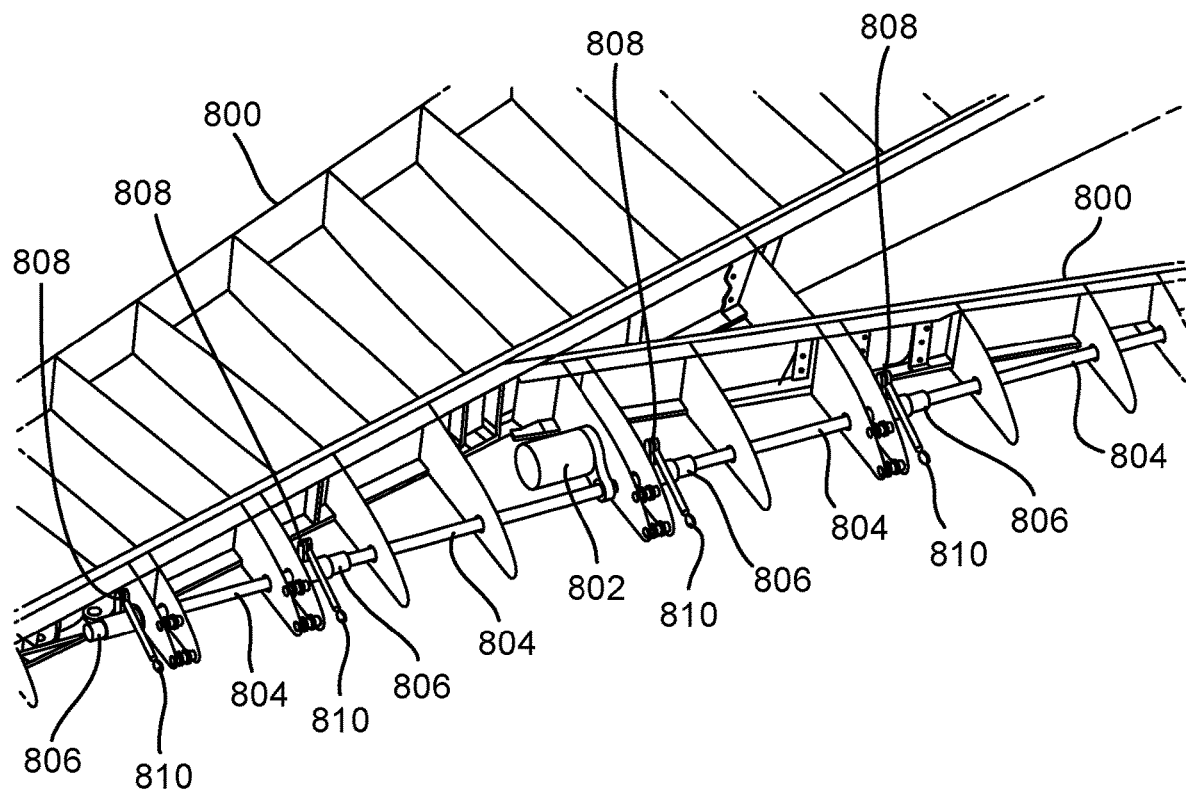
FIG. 8 is a schematic illustration (not to scale) showing an aircraft wing substructure, and the drive system for moving the fairing.

FIG. 8 is a schematic illustration (not to scale) showing substructure 800 of an aircraft wing 102, and the drive system for moving the fairing 200 with respect to the wing 102.

Figure 9:
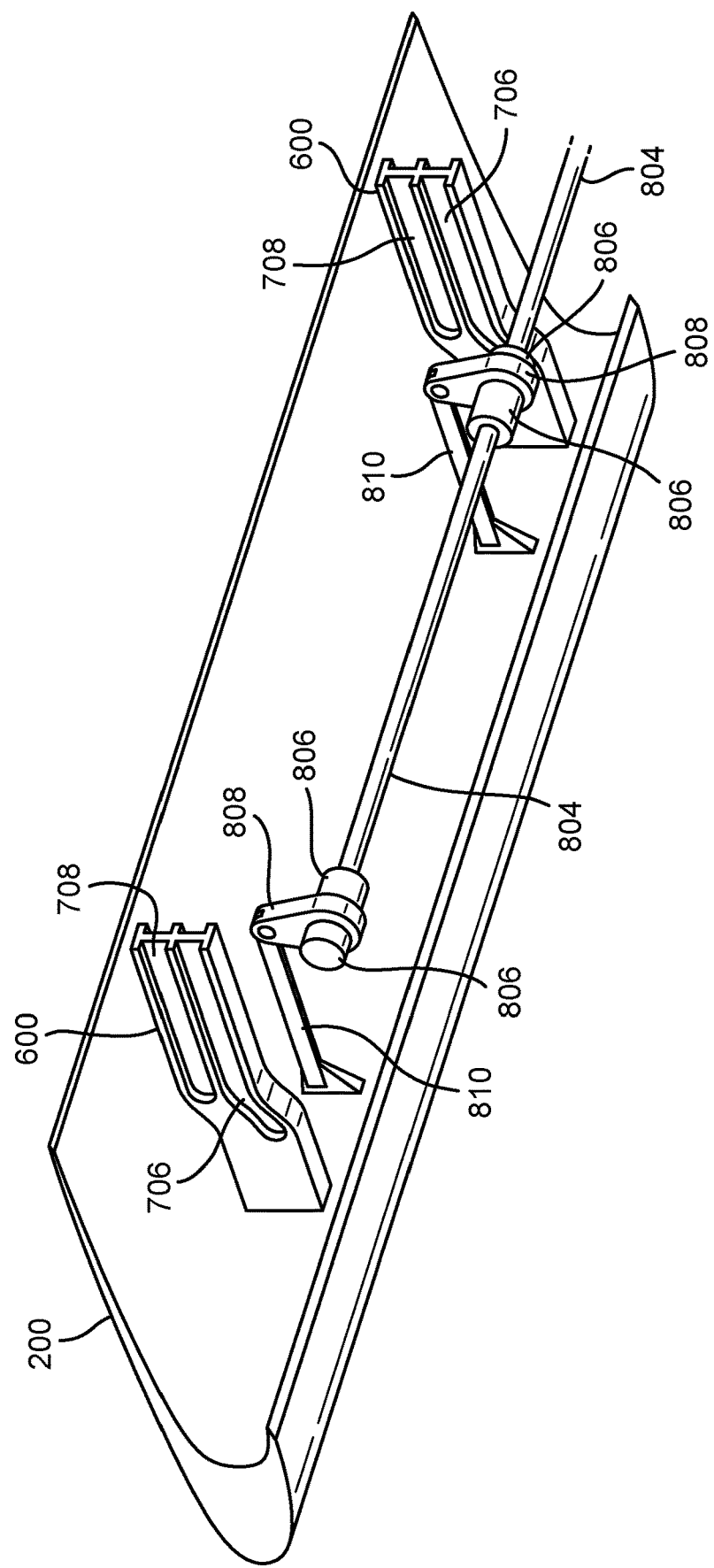
FIG. 9 is a schematic illustration (not to scale) showing the fairing from its trailing edge side, and a portion of the drive system coupled thereto.

FIG. 9 is a schematic illustration (not to scale) showing the fairing 200 from its trailing edge side, and a portion of the drive system coupled thereto.

In this embodiment, the drive system comprises a motor drive unit 802, a drive shaft 804, a plurality of strain wave gear devices 806, a plurality of cranks 808, and a plurality of connecting rods 810.

The motor drive unit 802 is fixedly attached to the wing substructure 800. The motor drive unit 802 is configured to drive the drive shaft 804 (i.e. to rotate the drive shaft 804 about its axis) under control of a control system (not shown). The motor drive unit 802 may be, for example, an electric or hydraulic motor.

In this embodiment, the drive shaft 804 comprises a plurality of drive shaft sections coupled together by flexible couplings. This advantageously tends to allow for wing flexion. Nevertheless, in some embodiments, the drive shaft 804 may be a continuous, single shaft.

In this embodiment, the strain wave gear devices 806 are spaced apart along the length of the drive shaft 804. The strain wave gear devices 806 are attached to respective shaft sections of the drive shaft 804. In this embodiment, the strain wave gear devices 806 are Harmonic Drive (Trademark) gearboxes. The strain wave gear devices 806 all have the same gearbox ratio. In this embodiment, each strain wave gear device 806 couples a respective crank 808 to the drive shaft 804. In some embodiments, gear systems other than Harmonic Drive (Trademark) gearboxes may be used.

Each crank 808 is an arm that is attached at one end at right angles to the drive shaft 804 via a respective strain wave gear devices 806. The other end of each crank 808 (i.e. the end opposite the end that is coupled to the drive shaft 804) is attached to a respective connecting rod 810 by a pivot.

Each connecting rod 810 is connected at one end to a respective crank 808 by a pivot, and at its opposite end to the fairing 200. In some embodiments, the connecting rods 810 have different lengths dependent upon their positions along the length of the aircraft wing 102. For example, connecting rods 810 closer to the wing tip may be shorter than those closer the aircraft fuselage.

In this embodiment, the strain wave gear devices 806 convert high velocity rotational movement of the drive shaft 804 into a high force, small distance movement of the cranks 808. The cranks 808 and connecting rods 810 are used to convert the circular motion imparted to them by the drive shaft 804 via the strain wave gear devices 806 into a reciprocating motion of the fairing 200. The end of each connecting rods 810 attached to a crank 808 moves in a circular motion, while the other end that is attached to the fairing 200 moves in a curvilinear sliding motion guided by the coupling mechanism 202 (i.e. by the brackets 600 and rollers 710, 712). Thus, rotation of the drive shaft 804 by the motor drive unit 802 causes rotation of the fairing 200 with respect to the aircraft wing 102.

Advantageously, the strain wave gear devices 806 may be the substantially the same as one another. In this embodiment, the strain wave gear devices 806 advantageously tend to harmonise the motion of the cranks 808 caused by rotation of the drive shaft 804. Therefore, for a given position along the length of the aircraft wing 102, it tends to be possible to achieve a desired movement range of the fairing 200 at that position by adjusting only the length of the crank 808 and/or the connecting rod 810 at that position. This tends to be different to conventional systems in which, for different positions along the length of the aircraft wing 102, differently configured actuators (e.g. linear actuators) are used.

The strain wave gear devices 806 are advantageously simple, and lightweight.

Thus, embodiments of the leading edge system 104 are provided.

In the above embodiments, the fairing may be moved from its retracted position to its dropped position and vice versa. Also, the fairing may be moved from its dropped position to its extended position, and vice versa. However, in other embodiments, the leading edge system is configured such that the fairing is moved in a different way. For example, in some embodiments, the fairing may be from between its retracted position and extended position, without being moved through its dropped position.

In the above embodiments, the drive system is used to move the fairing as described in more detail above with reference to FIGS. 2 to 6. However in other embodiments, the drive system is used to drive a different leading edge device such as a leading edge slat, a droop, a Krueger flap, or a leading edge cuff.

The above described embodiments are given purely as examples and are open to modification, in particular by the substitution of equivalent techniques or systems, without in so doing departing from the scope of the invention.

What is claimed is:

1. An aircraft wing system comprising:
an aircraft wing;
an edge device coupled to a leading edge or trailing edge of the aircraft wing;
a drive shaft rotatable about its axis;
a crank arm, a first end of the crank arm being coupled to the drive shaft, and a second end of the crank arm opposite to the first end being coupled to the edge device;
a gear system coupled between the drive shaft and the first end of the crank arm;
a further crank arm, a first end of the further crank arm being coupled to the drive shaft, and a second end of the further crank arm opposite to the first end being coupled to the edge device, the further crank arm being spaced apart from the crank arm along a length of the drive shaft; and
a further gear system coupled between the drive shaft and the first end of the further crank arm;
wherein a length of the crank arm is different to that of the further crank arm.

2. The aircraft wing system according to claim 1, wherein the crank arm is arranged to convert circular motion of the drive shaft to a reciprocating motion of the edge device.

3. The aircraft wing system according to claim 1, wherein the gear system is configured such that a relatively higher speed rotation of the drive shaft causes a relatively lower speed rotation of the first end of the crank arm.

4. The aircraft wing system according to claim 1, wherein the gear system is a strain wave gear system.

5. The aircraft wing system according to claim 4, wherein the gear system is a Harmonic Drive gear system.

6. The aircraft wing system according to claim 1, wherein a gear ratio of the gear system is the same as that of the further gear system.

7. The aircraft wing system according to claim 1, wherein
the drive shaft extends at least partially along a length of the aircraft wing;
the crank arm is shorter than the further crank arm; and
the crank arm is located closer to a tip of the aircraft wing than the further crank arm.

8. The aircraft wing system according to claim 1, wherein:
the edge device comprises a fairing coupled to the leading edge of the aircraft wing;
the drive shaft, the crank arm, and the gear system are operable to move the fairing relative to the aircraft wing between a stowed position, a first deployed position, and a second deployed position;
the stowed position is when the fairing is in contact with the aircraft wing and the fairing serves as a continuation of the aircraft wing;
the first deployed position is when the fairing is in contact with the aircraft wing and located below the stowed position; and
the second deployed position is when the fairing is spaced apart from the leading edge of the aircraft wing, thereby defining a gap between the fairing and the leading edge through which air may flow.

9. The aircraft wing system according to claim 8, wherein
the drive shaft, the crank arm, and the gear system are operable to move the fairing relative to the aircraft wing between the stowed position and the first deployed position by rotating the fairing about a first axis;
the drive shaft, the crank arm, and the gear system are operable to move the fairing relative to the aircraft wing between the first deployed position and the second deployed by rotating the fairing about a second axis; and
the second axis is a different axis to the first axis.

10. The aircraft wing system according to claim 1, further comprising:
a guiding system for guiding movement of the edge device relative to the aircraft wing, the guiding system comprising:
a bracket fixed to either the edge device or the aircraft wing, the bracket comprising two roller tracks; and
two rollers fixed to the other of the one of the edge device and the aircraft wing than the one to which the bracket is fixed, the rollers being fitted in respective roller tracks of the bracket, each roller being configured to roll along the roller track to which it is fitted.

11. The aircraft wing system according to claim 10, wherein at least one roller track comprises a first curved portion and a second curved portion joined together to form a continuous track, the first curved portion having a different curvature to the second curved portion.

12. An aircraft comprising an aircraft wing system according to claim 1.

13. A method of operating an aircraft wing system, the aircraft wing system comprising:
an aircraft wing;
an edge device coupled to a leading edge or trailing edge of the aircraft wing;
a drive shaft rotatable about its axis;
a crank arm, a first end of the crank arm being coupled to the drive shaft, and a second end of the crank arm opposite to the first end being coupled to the edge device; and
a gear system coupled between the drive shaft and the first end of the crank arm;

a further crank arm, a first end of the further crank arm being coupled to the drive shaft, and a second end of the further crank arm opposite to the first end being coupled to the edge device, the further crank arm being spaced apart from the crank arm along a length of the drive shaft; and a further gear system coupled between the drive shaft and the first end of the further crank arm;

wherein a length of the crank arm is different to that of the further crank arm; the method comprising:

rotating the drive shaft so as to cause circular motion of the first end of each crank arm, thereby moving, relative to the aircraft wing, the edge device coupled to the second end of each crank arm.

\* \* \* \* \*